(12) United States Patent
Mithal et al.

(10) Patent No.: US 10,372,503 B2
(45) Date of Patent: Aug. 6, 2019

(54) BIDIRECTIONAL FEEDBACK WITH AN ENHANCED TRANSMISSION SELECTION ENABLED SWITCH

(71) Applicant: International Business Machines Corporation, Armonk, NY (US)

(72) Inventors: Akshat Mithal, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 15/617,947

(22) Filed: Jun. 8, 2017

(65) Prior Publication Data

US 2018/0357109 A1 Dec. 13, 2018

(51) Int. Cl.
| | | |
|---|---|---|
| G06F 9/50 | (2006.01) | |
| H04L 12/26 | (2006.01) | |
| H04L 12/931 | (2013.01) | |
| G06F 9/455 | (2018.01) | |
| H04L 12/24 | (2006.01) | |

(52) U.S. Cl.
CPC ........ *G06F 9/5077* (2013.01); *G06F 9/45558* (2013.01); *H04L 41/0896* (2013.01); *H04L 41/142* (2013.01); *H04L 43/0894* (2013.01); *H04L 49/35* (2013.01); *G06F 2009/45595* (2013.01); *H04L 43/16* (2013.01)

(58) Field of Classification Search
CPC .................................................... G06F 9/5077
See application file for complete search history.

(56) References Cited

U.S. PATENT DOCUMENTS

| | | |
|---|---|---|
| 2013/0179636 A1 | 7/2013 | Shirasu et al. |
| 2016/0019078 A1 | 1/2016 | Challa et al. |
| 2016/0072723 A1 | 3/2016 | Shanmuganathan et al. |
| 2016/0094413 A1 | 3/2016 | Jain |
| 2017/0245185 A1* | 8/2017 | Chuberre .......... H04B 7/15507 |

OTHER PUBLICATIONS

C. Hong et al., "ANCS: Achieving QoS through Dynamic Allocation of Network Resources in Virtualized Clouds", Hindawi Publishing Corporation Scientific Programming, vol. 2016, Article ID 4708195, Feb. 27, 2016, 11 pages.

* cited by examiner

*Primary Examiner* — Charlie Sun
(74) *Attorney, Agent, or Firm* — Kunzler Bean & Adamson

(57) ABSTRACT

A network switch manager apparatus includes a bandwidth module, a resource module, a variance module, and an adjustment module. The bandwidth module determines a percentage of bandwidth allocated to one of a plurality of protocols at an enhanced transmission selection (ETS) enabled network switch. The resource module determines a number of resources allocated for a plurality of virtual machines, the number of resources classified between the plurality of protocols. The variance module compares the percentage of bandwidth and the number of resources to determine a variance. The adjustment module adjusts the percentage of bandwidth allocated to the one of the plurality of protocols based on the variance.

20 Claims, 6 Drawing Sheets

BIDIRECTIONAL FEEDBACK WITH AN ENHANCED TRANSMISSION SELECTION ENABLED SWITCH

FIELD

The subject matter disclosed herein relates to enhanced transmission selection (ETS) settings on a network and more particularly relates to a mechanism to balance and match resource allocation at a server level with optimal bandwidth at an ETS enabled switch.

BACKGROUND

Many services/infrastructure that typically resided on a consumers physical computing hardware are now delivered remotely using cloud computing. The quality of service rendered in the form of quick and reliable infrastructure, platform, and other services are affected by many parameters that if more efficiently allocated can provide a higher quality of service for cloud computing consumers.

BRIEF SUMMARY

A network switch manager apparatus is disclosed. The network switch manager apparatus includes a bandwidth module, a resource module, a variance module, and an adjustment module. The bandwidth module determines a percentage of bandwidth allocated to one of a plurality of protocols at an enhanced transmission selection (ETS) enabled network switch. The resource module determines a number of resources allocated for a plurality of virtual machines, the number of resources classified between the plurality of protocols. The variance module compares the percentage of bandwidth and the number of resources to determine a variance. The adjustment module adjusts the percentage of bandwidth allocated to the one of the plurality of protocols based on the variance A method is also disclosed. The method includes determining a percentage of bandwidth allocated to one of a plurality of protocols at an enhanced transmission selection (ETS) enabled network switch. The method further includes determining a number of resources allocated for a plurality of virtual machines, the number of resources classified between the plurality of protocols. The method further includes comparing the percentage of bandwidth and the number of resources to determine a variance. The method further includes adjusting the percentage of bandwidth allocated to the one of the plurality of protocols based on the variance.

A computer program product is also disclosed. The computer program product includes a computer readable storage medium having program instructions embodied therewith. The program instructions readable/executable by a processor to cause the processor to determine a percentage of bandwidth allocated to one of a plurality of protocols at an enhanced transmission selection (ETS) enabled network switch. The program instructions readable/executable by the processor to further cause the processor to determine a number of resources allocated for a plurality of virtual machines, the number of resources classified between the plurality of protocols. The program instructions readable/executable by the processor to further cause the processor to compare the percentage of bandwidth and the number of resources to determine a variance. The program instructions readable/executable by the processor to further cause the processor to adjust the percentage of bandwidth allocated to the one of the plurality of protocols based on the variance.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
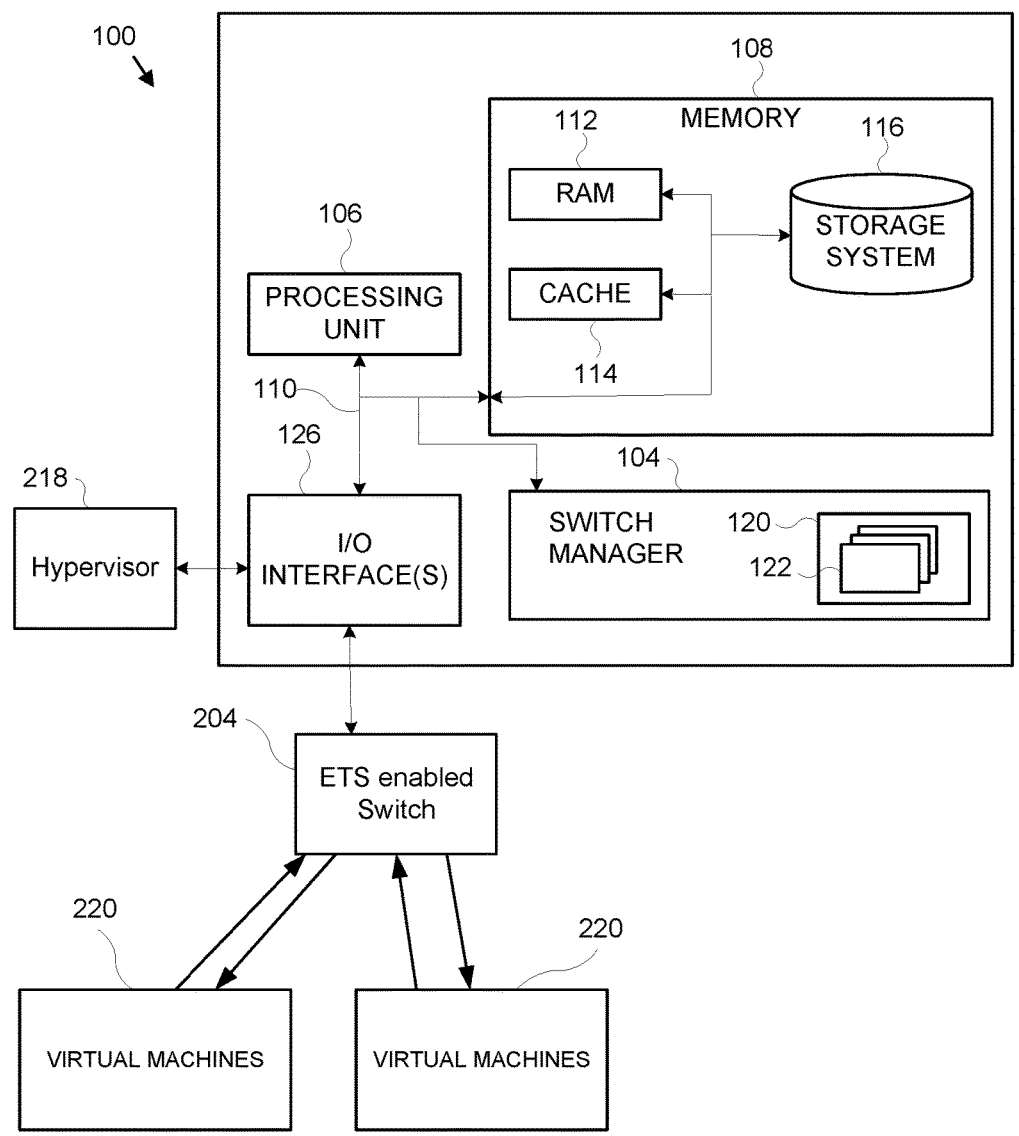
FIG. 1 is a schematic diagram illustrating one embodiment of a computer system that is applicable to implement the embodiments of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer or other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations which are not shown or described in detail to avoid obscuring aspects of an embodiment.

Enhanced Transmission Selection (ETS) is a quality of service (QoS) feature implemented via the Data Center Bridging Capabilities Exchange Protocol (DCBX) in switches. With this feature, bandwidth can be allocated to different traffic classes, for e.g., amongst Fiber Channel over Ethernet (FCoE) and Internet Small Computer System Interface (iSCSI) protocols when both types of traffic are handled by the same switch.

While many embodiments are described herein, at least some of the described embodiments of the invention relate generally to efficiently allocating bandwidth at an ETS enabled switch. Some embodiments allow for the modifying of resource allocation at the switch level by enabling feedback at a network switch of system resource utilization associated with a particular protocol. Some embodiments allow for protocol level decision making of bandwidth levels as a network switch.

The description of elements in each figure may refer to elements of proceeding figures. Like numbers refer to like elements in all figures, including alternate embodiments of like elements.

FIG. 1 shows an exemplary computer system 100 that is applicable to implement the embodiments of the present disclosure. Computer system 100 is only illustrative and is not intended to suggest any limitation as to the scope of use or functionality of embodiments of the disclosure described herein. The components of computer system 100 may include, but are not limited to, a switch manager 104, one or more processors or processing units 106, a system memory 108, I/O interfaces 126, and a bus 110 that couples various system components including system memory 108 to processor 106.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 100 typically includes a variety of computer system readable media. Such media may be any available media that is accessible by computer system 100, and it includes both volatile and non-volatile media, removable and non-removable media.

System memory 108 can include computer system readable media in the form of volatile memory, such as random access memory (RAM) 112 and/or cache memory 114. Computer system 100 may further include other removable/non-removable, volatile/non-volatile computer system storage media. By way of example only, storage system 116 can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 110 by one or more data media interfaces. As will be further depicted and described below, switch manager 104 may include at least one program product having a set (e.g., at least one) of program modules 122 that are configured to carry out the functions of embodiments of the disclosure. In some embodiments, the program product 120 is stored on memory 108.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data, or some combination thereof, may include an implementation of a networking environment. Program modules 122 generally carry out the functions and/or methodologies of embodiments of the disclosure as described herein.

Computer system 100 may also communicate with one or more external devices such as a keyboard, a pointing device, a display, etc.; one or more devices that enable a user to interact with computer system 100; any devices (e.g., network card, modem, etc.) that enable computer system 100 to communicate with one or more other computing devices; a hyper visor 202; and/or a switch 204. Such communication can occur via input/output (I/O) interfaces 126. Still yet, computer system 100 can communicate with one or more networks such as a local area network (LAN), a general wide area network (WAN), a storage area network (SAN), and/or a public network (e.g., the Internet) via network adapter. A network adapter communicates with the other components of the computer system 100 via bus 110. While not shown, other hardware and/or software components could be used in conjunction with computer system 100. Examples, include, but are not limited to, microcode, device drivers, redundant processing units, external disk drive arrays, RAID systems, tape drives, and data archival storage systems, etc.

In one embodiment, the computer system 100 is part of or is in communication with a network such as a storage area network (SAN) and the switch 204. Communication with other devices, apparatuses, or systems on the network may be handled by the I/O interfaces 126 or the network adapter as needed. In some embodiments, the computer system 100 includes various modules, described in greater detail below, to manage the network switch 204. In some embodiments, the computer system 100 manages bandwidth settings of particular protocols at the switch 204. In some embodiments, the computer system 100 independently or in conjunction with other systems or devices, tracks bandwidth allocation information and resource allocation information to efficiently provide resources from hardware to virtual machines 220. In some embodiments, the computer system 100 interacts with a hypervisor 218 associated with virtual machines 220. The hypervisor 218 may be a type 1 baremetal hypervisor or a type 2 hypervisor.

Fewer or more than these functions and other functions may be accomplished wholly or in part by the computer system 100 or another embodiment of the computer system 100. In some implementations, various components of the computer system 100 are part of the switch 204 or interact with the switch 204 as a plug-in.

Figure 2:
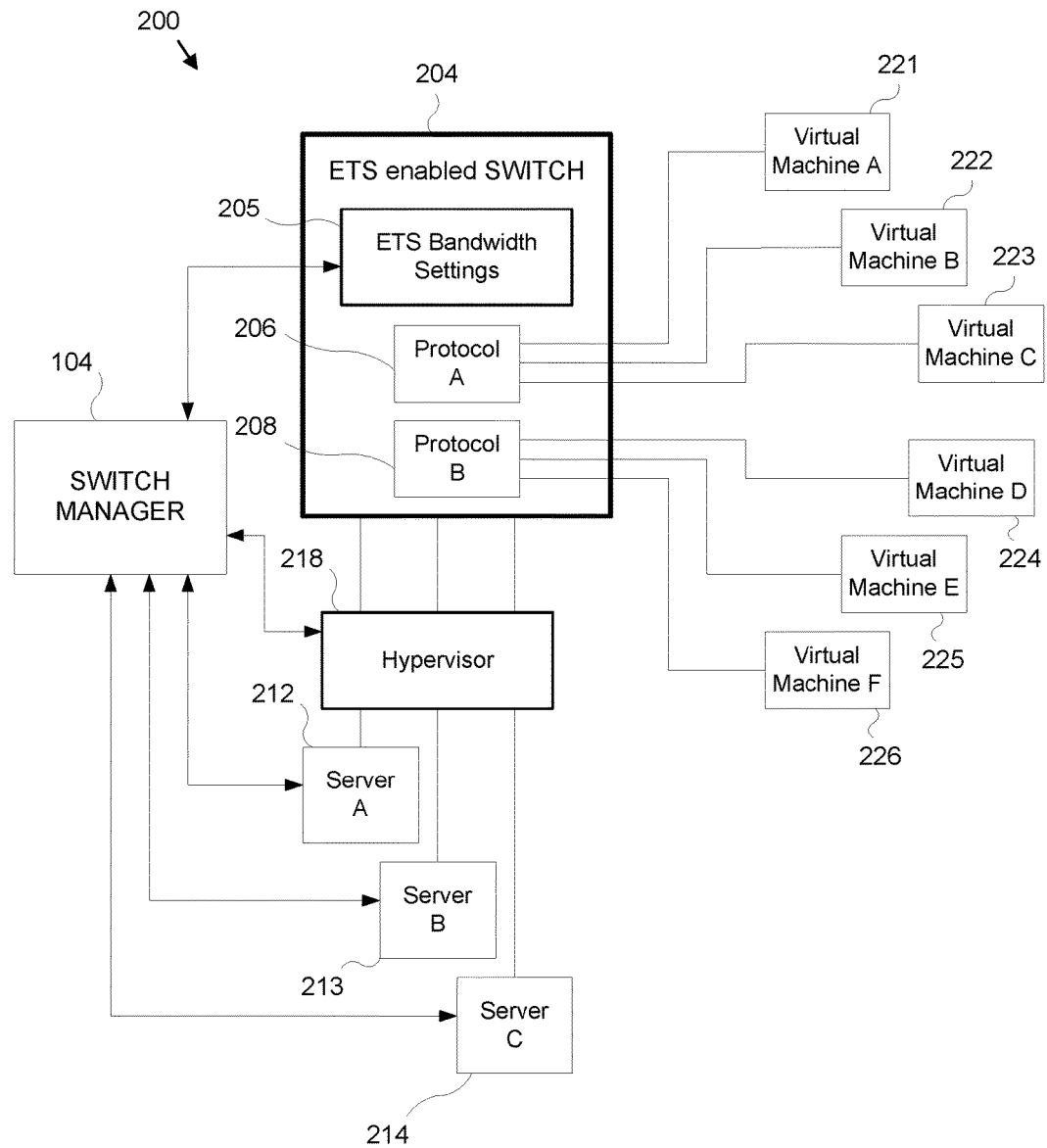
FIG. 2 is a schematic block diagram illustrating one embodiment of an arrangement 200 for modifying bandwidth allocation at a switch level in accordance with the present invention.

FIG. 2 is a schematic diagram illustrating one embodiment of an arrangement 200 for modifying bandwidth allocation at a switch level in accordance with the present invention. In the illustrated embodiment, a hypervisor 218 is hosting six guest machines or virtual machines A-F 221-226 and requesting resources of host machines physical hardware, e.g., servers A-C 212-214. The virtual machines may utilize various protocols for I/O requests. In the illustrated embodiment, virtual machines A-C 221-223 utilize protocol A 206 for I/O requests and virtual machines D-F 224-226 utilize protocol B 208 for I/O requests. In one embodiment protocol A 206 is the Fiber Channel over Ethernet (FCoE) protocol and protocol B 208 is the Internet Small Computer System Interface (iSCSI) protocol but other protocols may be utilized including, but not limited to, ATA over Ethernet (AoE), or other protocol representation which can negotiate between a switch and server.

An ETS enabled switch 204 is a network switch or SAN switch with the capability to support an Enhanced Transmission Selection (ETS) feature which allocates bandwidth for different classes of service or protocols. Such a switch 204 is described as an ETS enabled switch 204 herein. ETS ensures minimum bandwidth is guaranteed (as per the allocation) for a particular class of service. In the illustrated embodiment, the ETS enabled switch 204 allocates bandwidth to virtual machines 221-226 based on protocols 206, 208. The ETS bandwidth settings 205 allocate a set percentage of bandwidth at the switch 204 to protocol A 206 and a set percentage of bandwidth at the switch 204 to protocol B 208. Although shown with only two protocols A and B 206, 208, other embodiments, may include more than two protocols with set percentages of bandwidth allocation.

In sharing the resources (CPU, RAM, and other network resources) of the physical hardware (e.g., servers A-C 212-214), the virtual machines A-F 221-226 may increase and decrease IOPs over time depending on the needs of the virtual machines A-F 221-226. In conventional systems, there is a disconnect between resource allocation at the server level and the bandwidth allocation dedicated to a certain protocol at the switch level. Embodiments allow a mechanism to determine imbalances between server resources and bandwidth allocation at the switch level.

In some embodiments, there is a mechanism for the network administrator to determine whether ETS bandwidth settings 205 on a network switch should be modified in order to balance and match resource allocation at the server level so that optimal ETS bandwidth settings 205 are applied to the network switch.

There could be changes happening at a virtual machine resource allocation level, such that a virtual machine's CPU, RAM and Network shares are reduced and it therefore cannot fully use the allocated bandwidth to the protocol that the virtual machine is using. Feedback/warning may be generated using a switch manager 104 indicating a change in resource allocation at server side, a network administrator can correspondingly increase or decrease bandwidth allocation to specific protocols that the virtual machines are using. As I/O resources at the server level for traffic of a particular protocol are reduced, the bandwidth allocation to traffic of the particular protocol on the ETS enabled switch 204 may be reduced at the same level, thus allowing traffic from another protocol to use the extra bandwidth in crunch (congestion) scenarios.

A switch manager 104 is utilized as a mechanism to determine imbalances at the ETS enable switch 204, notify of such imbalances, and/or rectify such imbalances. The switch manager 104 may include a program 120 and program modules 122, which execute the functions described herein. In some embodiments, the switch manager 104 is configured to pull bandwidth allocation information from the ETS enabled switch 204. The bandwidth allocation information may include the percentage of bandwidth dedicated to particular protocols A-B 206, 208. In some embodiments, bandwidth allocation information may include further information regarding the breakdown of bandwidth resources as the switch 204.

In some embodiments, the switch manager 104 is configured to pull resource allocation information. Resource allocation information may include information regarding hardware resource information or virtual machine resource information. In some embodiments, resource allocation information includes the number of I/O requests over a period of time. In some embodiments, resource allocation information includes the number of I/O requests outstanding. In some embodiments, resource allocation information includes the percentage of hardware resources utilized by a certain protocol. In some embodiments, resource allocation information includes the percentage of hardware resources utilized by a certain protocol over a period of time. In some embodiments, resource allocation information includes the number of connections using a certain protocol. In some embodiments, resource allocation information includes the number of connections using a certain protocol over a period of time. In some embodiments, resource allocation information includes the pause frame data for network connections. In some embodiments, resource allocation information includes the pause frame data for certain protocols. In some embodiments, resource allocation information includes the peak bandwidth utilization by protocol. In some embodiments, resource allocation information includes the peak bandwidth utilization by protocol over a period of time. The switch manager 204 may pull the resource allocation information from the hardware itself (e.g., servers A-C 212-214), from a hypervisor 218, from the virtual machines, or from a combination thereof.

In some embodiments, the switch manager 104 is configured to compare the bandwidth allocation information at the switch 204 with the resource allocation information. Some embodiments include a mechanism to compare information and adjust bandwidth allocation of protocols based on the resource allocation of each protocol. A comparison of bandwidth allocation information by protocol at the switch 204 with resource allocation information is based on the particular bandwidth allocation information utilized and the particular resource allocation information utilized.

In some embodiments, the percentage of bandwidth allocation of protocol A 206 is compared to the percentage of resource allocation for protocol A 206 at hypervisor 218. In some embodiments, the percentage of bandwidth allocation of protocol A 206 is compared to a percentage of the I/O requests associated with protocol A 206 over a period of time. In some embodiments, the percentage of bandwidth allocation of protocol A 206 is compared to a percentage of I/O requests associated with protocol A 206 outstanding. In some embodiments, the percentage of bandwidth allocation of protocol A 206 is compared to the percentage of hardware resources utilized by protocol A 206. In some embodiments, the percentage of bandwidth allocation of protocol A 206 is compared to the percentage of hardware resources utilized by protocol A 206 over a period of time. In some embodiments, the percentage of bandwidth allocation of protocol A 206 is compared to the number of network connections using protocol A 206 as a percentage of a total number of network connections. In some embodiments, the percentage of bandwidth allocation of protocol A 206 is compared to the number of network connections using protocol A over a period of time. In some embodiments, the percentage of bandwidth allocation of protocol A 206 is compared to the pause frame data for protocol A 206 at the network connections. In some embodiments, the percentage of bandwidth allocation of protocol A 206 is compared to a percentage of the pause frames for protocol A 206.

In some embodiments, bandwidth allocation information is compared to peak bandwidth utilization. In some embodiments, the percentage of bandwidth allocation of protocol A 206 is compared to the peak bandwidth utilization by protocol A 206. In some embodiments, the percentage of bandwidth allocation of protocol A 206 is compared to the peak bandwidth utilization by protocol A 206 over a period of time.

In some embodiments, the switch manager 104 is configured to determine a variance between the bandwidth allocation information and the resource allocation information. The variance between the bandwidth allocation information and the resource allocation information may calculated as a difference in percentage. For example, bandwidth allocation information may indicate that 50% of bandwidth is allocated for protocol A 206 and 50% of bandwidth is allocated for protocol B 208. The resource allocation information may further indicate that the number of network connections associated with protocol A 206 over a period of time is 75% as compared to the number of network connection associated with protocol B 208 over a period of time which is 25%. The switch manager 104 is configured to determine a variance of 25% for protocol A 206.

In some embodiments, the switch manager 104 is configured to send a notification to suggest an adjustment of the bandwidth allocation of a particular protocol base on the variance between the bandwidth allocation information and the resource allocation information. The notification may be sent to a network administrator or to the ETS enabled switch 204. In some embodiments, the notification is only sent if the variance between the bandwidth allocation information and the resource allocation information exceeds a threshold. For example, for small variances no notification is sent. If the variance between the bandwidth allocation information and the resource allocation information exceeds, for example, 10% then the notification is sent. The threshold level may be set or determined by a network administrator.

In some embodiments, the switch manager 104 is configured to adjust the bandwidth allocation of a particular protocol based on the variance between the bandwidth allocation information and the resource allocation information. In some embodiments, the adjustment occurs automatically based on the variance between the bandwidth allocation information and the resource allocation information. In some embodiments, the adjustment only occurs after the notification is sent. In some embodiments, the adjustment only occurs after approval by the network administrator. The level adjustment may be based on the variance between the bandwidth allocation information and the resource allocation information. This allows the switch manager 104 to dynamically adjust bandwidth allocation at a switch level based on the resource allocation information at the server level so that even when the server level adjusts to varying needs of the virtual machines 221-226, there is no bottleneck at the network switch. Bandwidth allocation by protocol can be adjusted to meet the needs of the virtual machines.

Although described in a particular network setting, embodiments described herein can be a heuristic technique for achieving optimization of resources in Software Defined Environments. Such techniques, in some embodiments, can be implemented via Open Stack. Such techniques are relevant to Hyper-converged Architectures. In some embodiments, the switch manager 104 is implemented as a plugin.

Figure 3:
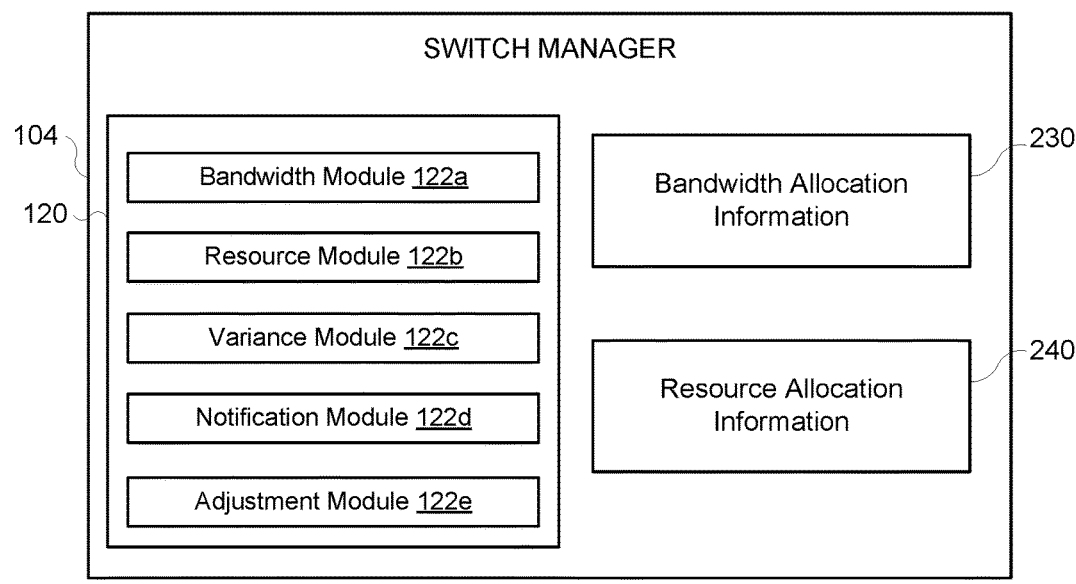
FIG. 3 is a schematic diagram illustrating one embodiment of a switch manager in accordance with the present invention.

Referring to FIG. 3, an embodiment of the switch manager 104 is shown. In the illustrated embodiment, the switch manager 104 includes various modules 122 configured to execute and perform the features, functions, and steps described more fully herein with regard to FIGS. 1-2 and 4-6. The switch manager 104 includes a bandwidth module 122a. In some embodiments, the bandwidth module 122a is configured to determine, pull, and store bandwidth allocation information 230.

In some embodiments, the switch manager 104 includes a resource module 122b. In some embodiments, the resource module 122b is configured to determine, pull, and store resource allocation information 240 as described more fully herein with regard to FIGS. 1-2 and 4-6.

In some embodiments, the switch manager 104 includes a variance module 122c. In some embodiments, the variance module 122c is configured to compare the bandwidth allocation information 230 with the resource allocation information 240 and determine any variance between the two as described more fully herein with regard to FIGS. 1-2 and 4-6.

In some embodiments, the switch manager 104 includes a notification module 122d. In some embodiments, the notification module 122d is configured to send a notification of any variance between the bandwidth allocation information 230 and the resource allocation information 240 as described more fully herein with regard to FIGS. 1-2 and 4-6.

In some embodiments, the switch manager 104 includes an adjustment module 122e. In some embodiments, the adjustment module 122e is configured to adjust the bandwidth allocation associated with a particular protocol based on the variance between the bandwidth allocation information 230 and the resource allocation information 240 as described more fully herein with regard to FIGS. 1-2 and 4-6.

Figure 4:
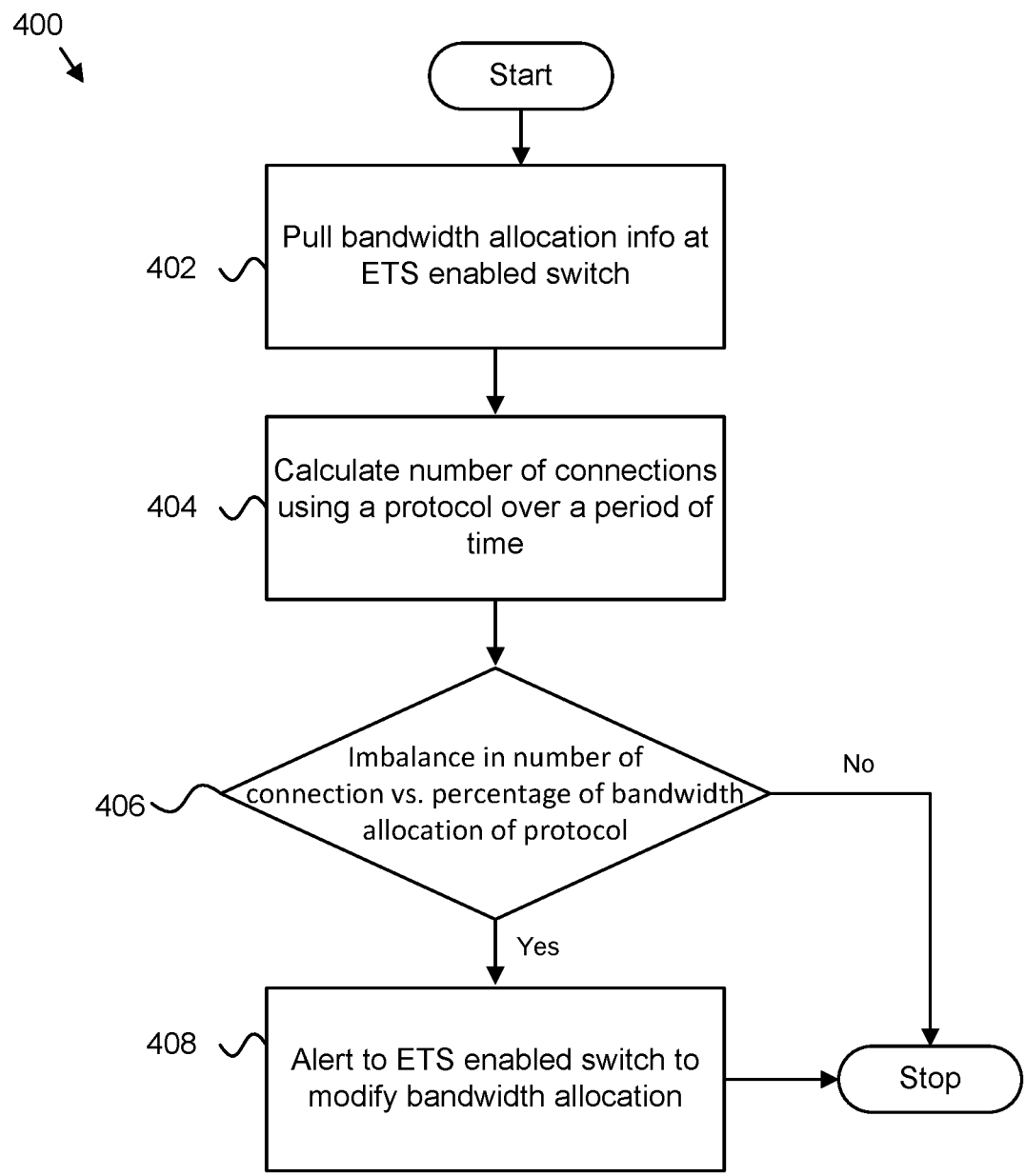
FIG. 4 is a schematic flow chart diagram illustrating one embodiment of a method in accordance with the present invention.

FIG. 4 is a schematic flow chart diagram illustrating one embodiment of a method 400 in accordance with the present invention. At block 402, the method 400 includes pulling bandwidth allocation information at an ETS enabled switch. At block 404, a number of connections using the various protocols over a period of time is calculated. At block 406, it is determined whether there is an imbalance in the number of connections associated with a protocol versus the percentage of bandwidth allocated to the protocol. If an imbalance is determined and the pause frame data for the protocol exceeds a threshold, at block 408, an alert is sent to the ETS enabled switch to modify the bandwidth allocation for the protocol. In some embodiments, a number of pause frames is determined for the protocols.

Figure 5:
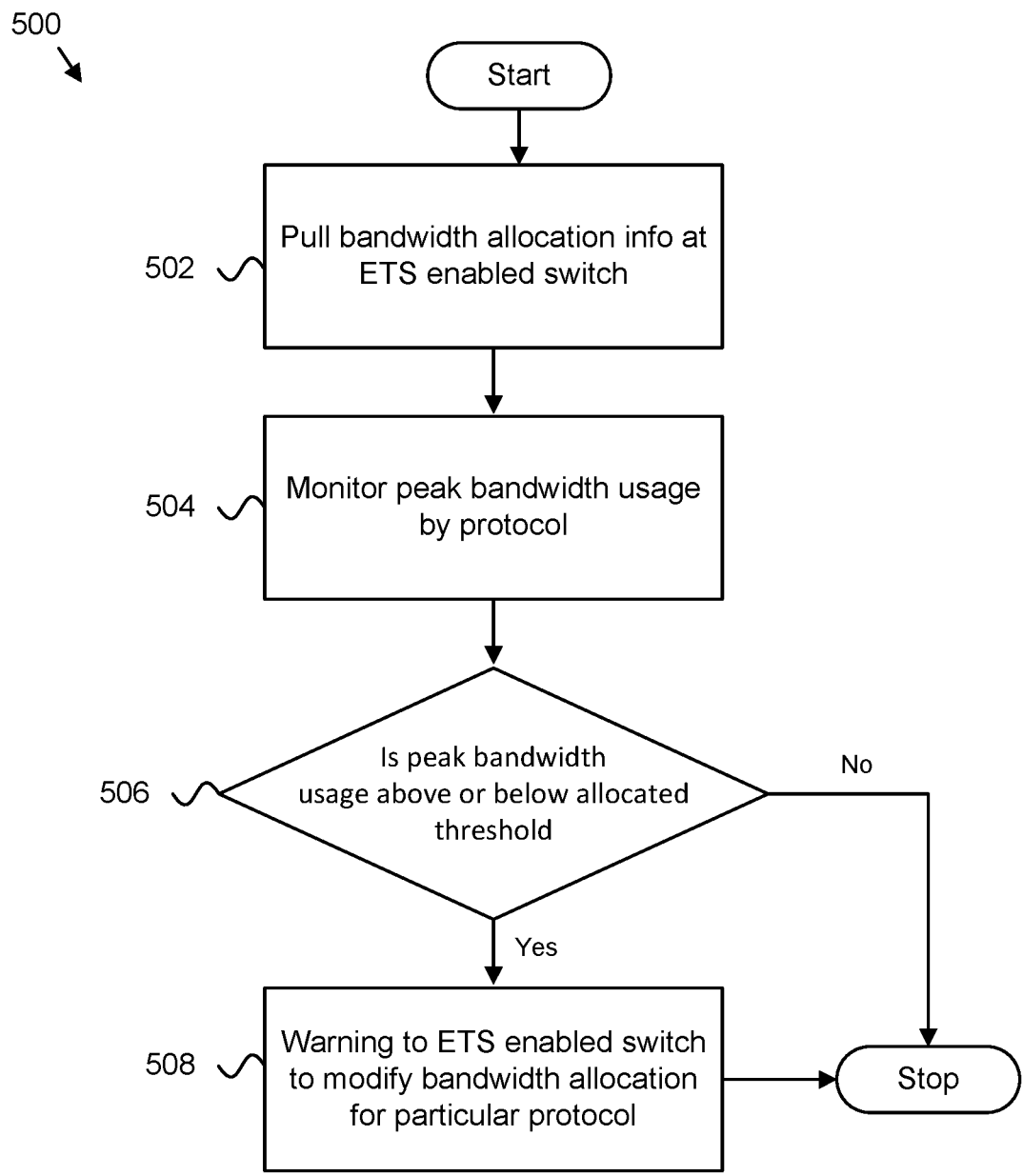
FIG. 5 is a schematic flow chart diagram illustrating one embodiment of a method in accordance with the present invention.

FIG. 5 is a schematic flow chart diagram illustrating one embodiment of a method 500 in accordance with the present invention. At block 502, the method 500 includes pulling bandwidth allocation information at an ETS enabled switch. At block 504, the peak bandwidth usage is monitored for each protocol. At block 506, it is determined whether the peak bandwidth usage of a protocol is above or below an allocated threshold. At block 508, in response to a determination that peak bandwidth usage of a protocol is above or below an allocated threshold, a warning is issued to the ETS enabled switch to modify the bandwidth allocation for the protocol. In some embodiments, the bandwidth usage is monitored continuously and an alert is sent upon a change is the peak bandwidth usage. In some embodiments, the bandwidth usage is monitored over a set period of time.

In a scenario, a switch may have bandwidth allocated such that, one of the protocols is allocated bandwidth which is much lesser than what it consistently uses in times of congestion, switch can have a switch manager which monitors this imbalance and creates a suggestion to an administrator to increase the bandwidth allocation to improve on latencies.

In cases of bandwidth allocation where ETS allocates a bandwidth in switch, which even in times of congestion, never reaches a defined allocated threshold, the switch manager residing inside or outside of switch can monitor bandwidth usage over a period of time and create a suggestion to an administrator to reduce the bandwidth allocation to the class of traffic.

Figure 6:
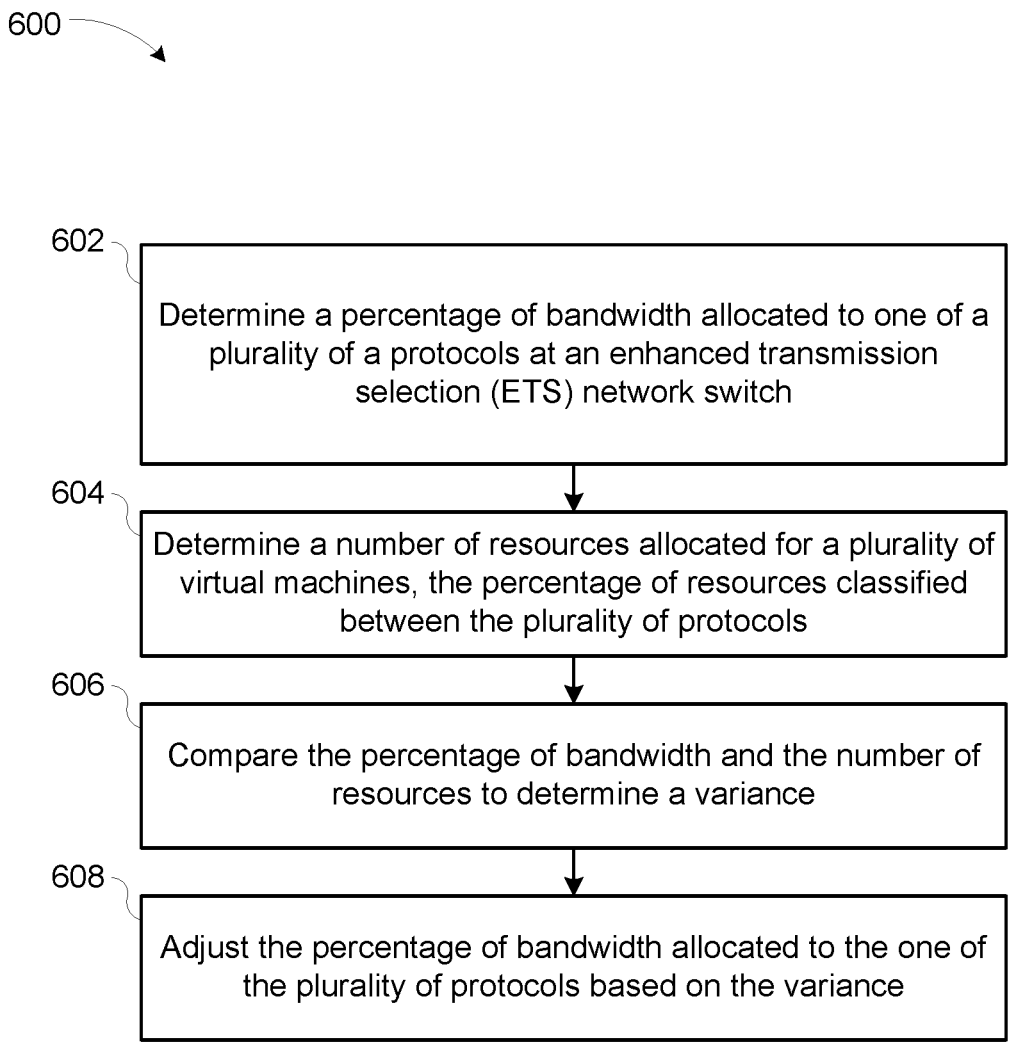
FIG. 6 is a schematic flow chart diagram illustrating one embodiment of a method in accordance with the present invention.

FIG. 6 is a schematic flow chart diagram illustrating one embodiment of a method 600 in accordance with the present invention. At block 602, the method 600 includes determining a percentage of bandwidth allocated to one of a plurality of protocols at an enhanced transmission selection (ETS) enabled switch. At block 604, the method 600 includes determining a number of resources allocated for a plurality of virtual machines, the number of resources classified between the plurality of protocols. At block 606, the method 600 includes comparing the percentage of bandwidth and the number of resources to determine a variance. At block 608, the method 600 includes adjusting the percentage of bandwidth allocated to the one of the plurality of protocols based on the variance.

Making an administrator aware of relationship between server resource allocation & IO resource allocation on the network is an advantage of examples described herein which lead to: better utilization and optimization of host resources; and better optimization of Network Resources. In addition, fair allocation of network resources based on server resource allocation in congestion scenarios is an advantage of examples described herein.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, comprising:
   determining a percentage of bandwidth allocated to one of a plurality of protocols at an enhanced transmission selection (ETS) enabled switch;
   determining a number of resources allocated for a plurality of virtual machines, the percentage of resources classified between the plurality of protocols;
   comparing the percentage of bandwidth and the number of resources to determine a variance; and
   adjusting the percentage of bandwidth allocated to the one of the plurality of protocols based on the variance.

2. The method of claim 1, wherein determining the number of resources allocated for the plurality of virtual machines comprises pulling resource allocation information from a hypervisor associated with the plurality of virtual machines.

3. The method of claim 2, further comprising sending a notification of the variance to the ETS enabled switch.

4. The method of claim 1, wherein determining the number of resources allocated for the plurality of virtual machines comprises determining a percentage of I/O requests associated with the one of the plurality of protocols.

5. The method of claim 1, wherein determining the number of resources allocated for the plurality of virtual machines comprises determining a percentage of network connections utilizing the one of the plurality of protocols.

6. The method of claim 1, wherein determining the number of resources allocated for the plurality of virtual machines comprises determining a percentage of pause frames associated with the one of the plurality of protocols.

7. The method of claim 1, wherein the one of the plurality of protocols is internet small computer system interface (iSCSI) protocol.

8. The method of claim 1, wherein the one of the plurality of protocols is fiber channel over ethernet (FCoE).

9. The method of claim 1, wherein the method further comprises monitoring peak bandwidth utilization for the plurality of protocols.

10. The method of claim 1, wherein the method further comprises sending a notification to a network administrator of the variance if the variance exceeds a predetermined threshold.

11. A network switch manager apparatus, comprising:
    a processor and memory coupled to the processor, the processor configured to:
    determine a percentage of bandwidth allocated to one of a plurality of protocols at an enhanced transmission selection (ETS) enabled network switch;
    determine a number of resources allocated for a plurality of virtual machines, the number of resources classified between the plurality of protocols;
    compare the percentage of bandwidth and the number of resources to determine a variance; and
    adjust the percentage of bandwidth allocated to the one of the plurality of protocols based on the variance.

12. The apparatus of claim 11, wherein the processor is further configured to send a notification of the variance to the ETS enabled switch.

13. The apparatus of claim 11, wherein the number of resources allocated for the plurality of virtual machines comprises a percentage of I/O requests associated with the one of the plurality of protocols.

14. The apparatus of claim 11, wherein the number of resources allocated for the plurality of virtual machines comprises a percentage of pause frames associated with the one of the plurality of protocols.

15. The apparatus of claim 11, wherein the one of the plurality of protocols is internet small computer system interface (iSCSI) protocol.

16. The apparatus of claim 11, wherein the number of resources allocated for the plurality of virtual machines comprises a percentage of network connections utilizing the one of the plurality of protocols.

17. A computer program product for providing switch bandwidth management, the computer program product comprising a computer readable storage medium having program instructions embodied therewith, the program instructions readable/executable by a processor to cause the processor to:
    determine a percentage of bandwidth allocated to one of a plurality of protocols at an enhanced transmission selection (ETS) enabled network switch;
    determine a number of resources allocated for a plurality of virtual machines, the number of resources classified between the plurality of protocols;
    compare the percentage of bandwidth and the number of resources to determine a variance; and
    adjust the percentage of bandwidth allocated to the one of the plurality of protocols based on the variance.

18. The computer program product of claim 17, wherein the number of resources allocated for the plurality of virtual machines comprises a percentage of I/O requests associated with the one of the plurality of protocols.

19. The computer program product of claim 17, the program instructions readable/executable by the processor to further cause the processor to send a notification to a network administrator of the variance if the variance exceeds a predetermined threshold.

20. The computer program product of claim 18, the program instructions readable/executable by the processor to further cause the processor to send a notification of the variance to the ETS enabled switch.

\* \* \* \* \*